(12) United States Patent
Lu et al.

(10) Patent No.: US 8,060,620 B2
(45) Date of Patent: Nov. 15, 2011

(54) PROFILE DEPLOYMENT USING A GENERIC FORMAT

(75) Inventors: Yi Lu, Sammamish, WA (US); Olivier Contant, Redmond, WA (US); Wei Zhao, Bellevue, WA (US); Abhishek Abhishek, Woodinville, WA (US); Yue Chen, Bellevue, WA (US); Taroon Mandhana, Redmond, WA (US); Hong Liu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 690 days.

(21) Appl. No.: 11/599,126

(22) Filed: Nov. 14, 2006

(65) Prior Publication Data

US 2008/0086546 A1    Apr. 10, 2008

Related U.S. Application Data

(60) Provisional application No. 60/850,114, filed on Oct. 5, 2006.

(51) Int. Cl.
  *G06F 15/16* (2006.01)
(52) U.S. Cl. ........ 709/227; 709/228; 709/229; 709/249; 340/2.8; 340/2.9; 370/431; 370/432
(58) Field of Classification Search .................. 709/203, 709/223, 202, 220, 9, 205, 250, 225, 245, 709/204; 370/254, 338, 389, 463; 707/9, 707/205, 100; 726/1; 715/514; 725/46; 386/126; 705/51
See application file for complete search history.

(56) References Cited

U.S. PATENT DOCUMENTS

| | | | | |
|---|---|---|---|---|
| 6,031,904 A | * | 2/2000 | An et al. | 379/201.02 |
| 6,449,644 B1 | * | 9/2002 | Håål et al. | 709/223 |
| 6,466,932 B1 | * | 10/2002 | Dennis et al. | 710/33 |
| 6,542,515 B1 | * | 4/2003 | Kumar et al. | 370/463 |
| 6,920,455 B1 | * | 7/2005 | Weschler | 1/1 |
| 7,421,484 B2 | * | 9/2008 | Das | 709/220 |
| 7,636,941 B2 | * | 12/2009 | Blinn et al. | 726/21 |
| 7,743,100 B2 | * | 6/2010 | Cheah | 709/204 |

(Continued)

FOREIGN PATENT DOCUMENTS

JP    2005216215 A * 8/2005

OTHER PUBLICATIONS

Kuehnel et al. "Extending Windows Vista Native Wi-Fi Capabilities." Proc. of Microsoft WinHEC 2006. 2006. Print.*

(Continued)

*Primary Examiner* — Glenton B Burgess
*Assistant Examiner* — Michael Martinez
(74) *Attorney, Agent, or Firm* — Wolf, Greenfield & Sacks, P.C.

(57) ABSTRACT

A network enabled computer receives connection profile information in a generic form and creates one or more native mode profiles to establish connections. By accepting profile information in a generic form, profile information can be readily provided from one or more ways, including from a policy server, through a user interface or from a third party application. The profile information can be provided with an order of precedence so that profile information from different sources may be combined appropriately. Additionally, the profile information may be provided in an extensible format to allow profile information to be distributed to multiple computers, even if some have different hardware or software configurations and are not programmed to recognize extensions of the profile information.

15 Claims, 6 Drawing Sheets

U.S. PATENT DOCUMENTS

| | | | | |
|---|---|---|---|---|
| 2001/0040590 | A1* | 11/2001 | Abbott et al. | 345/700 |
| 2003/0217134 | A1* | 11/2003 | Fontoura et al. | 709/223 |
| 2004/0006744 | A1* | 1/2004 | Jones et al. | 715/514 |
| 2004/0030746 | A1* | 2/2004 | Kavacheri et al. | 709/203 |
| 2004/0044628 | A1* | 3/2004 | Mathew et al. | 705/51 |
| 2004/0198319 | A1* | 10/2004 | Whelan et al. | 455/411 |
| 2004/0203593 | A1* | 10/2004 | Whelan et al. | 455/411 |
| 2004/0205244 | A1* | 10/2004 | Marsico et al. | 709/245 |
| 2005/0125564 | A1* | 6/2005 | Bushmitch et al. | 709/250 |
| 2005/0135315 | A1* | 6/2005 | Sinha | 370/338 |
| 2005/0137737 | A1* | 6/2005 | Sato et al. | 700/121 |
| 2005/0149626 | A1* | 7/2005 | Manchester et al. | 709/220 |
| 2005/0204041 | A1* | 9/2005 | Blinn et al. | 709/225 |
| 2005/0260996 | A1* | 11/2005 | van de Groenendaal | 455/445 |
| 2006/0007901 | A1* | 1/2006 | Roskowski et al. | 370/338 |
| 2006/0023642 | A1* | 2/2006 | Roskowski et al. | 370/254 |
| 2006/0168158 | A1* | 7/2006 | Das | 709/220 |
| 2006/0209768 | A1* | 9/2006 | Yan et al. | 370/338 |
| 2006/0233191 | A1* | 10/2006 | Pirzada et al. | 370/463 |
| 2006/0288016 | A1* | 12/2006 | Sukumaran | 707/100 |
| 2007/0061394 | A1* | 3/2007 | Frid-Nielsen et al. | 709/202 |
| 2007/0123253 | A1* | 5/2007 | Simongini et al. | 455/433 |
| 2007/0220005 | A1* | 9/2007 | Castro Castro et al. | 707/9 |
| 2007/0226775 | A1* | 9/2007 | Andreasen et al. | 726/1 |
| 2007/0282951 | A1* | 12/2007 | Selimis et al. | 709/205 |
| 2007/0282982 | A1* | 12/2007 | Childress et al. | 709/223 |
| 2007/0294382 | A1* | 12/2007 | Fujii et al. | 709/223 |
| 2008/0031238 | A1* | 2/2008 | Harmelin et al. | 370/389 |
| 2008/0077638 | A1* | 3/2008 | Monk et al. | 707/205 |
| 2008/0079986 | A1* | 4/2008 | Ferlitsch | 358/1.15 |
| 2008/0228870 | A1* | 9/2008 | Schweier | 709/203 |
| 2009/0044225 | A1* | 2/2009 | Lin et al. | 725/46 |
| 2009/0136218 | A1* | 5/2009 | Packman et al. | 386/126 |

OTHER PUBLICATIONS

World Wide Web Consortium (W3C). Oct. 28, 2004. Web. May 8, 2010. <http://www.w3.org/TR/xmlschema-2/#string>.*

Bidgoli, Hossein. "Bluetooth- Wireless Personal Area Network." The Internet Encyclopedia. Hoboken, NJ: Wiley, 2003. Print.*

* cited by examiner

PROFILE DEPLOYMENT USING A GENERIC FORMAT

CROSS REFERENCE TO RELATED APPLICATIONS

This application claims the benefit under 35 U.S.C. §120 of U.S. Provisional Application Ser. No. 60/850,114, entitled "DATA MODEL AND DATA OPERATIONS FOR CENTRALIZED DEPLOYMENT OF WIRELESS CLIENTS," filed on Oct. 5, 2006, which is herein incorporated by reference in its entirety.

BACKGROUND

For a computer to connect to a network as a client, the computer must be configured with settings that are compatible with the network. Configuration may involve identifying the network to which a connection is to be established, as well as setting operating characteristics of the computer to be compatible with those of the network. For example, the computer must be configured to communicate using a protocol and with security settings compatible with that of the network.

The settings needed to configure a computer for access to a particular network are frequently stored in a "profile" stored in the computer. When a connection is requested to that network, the profile may be read from computer memory and the information in the profile may be used to configure the hardware and software elements so that they operate in a manner compatible with the network.

Known computer operating systems incorporate tools that allow users to create network profiles. Using these tools, a user may create a profile for each network to which the user may want to connect.

SUMMARY OF INVENTION

Requiring a computer user to create network profiles may be undesirable for multiple reasons. Many users lack sophisticated knowledge of network operation to enable them to appropriately specify a profile. Additionally, in an enterprise, a network administrator may want all client computers configured with certain settings for network access. Alternatively or additionally, a network administrator may wish to specify that some or all of the client computers on a network be configured so that they do not gain access to undesirable networks.

To facilitate the creation of network profiles, a client computer may be constructed with a profile manager. The profile manager may receive information on network profiles in a generic format. The profile manager may create native mode network profiles based on the generic profile information. Providing generic profile information allows profile information to be obtained from many sources. Sources for profile information may include a group policy server, commands entered through a scripting utility, a user interface or a third party software module.

The profile information alternatively or additionally may be formatted in accordance with an extensible schema. The extensible schema may allow computers that receive and process the profile information to identify and ignore extensions to the profile information that they are not programmed to process. In this way, both forwards and backwards compatibility may be provided, which can facilitate widespread distribution of profile information to multiple clients, deployed at different times.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

By facilitating the creation and manipulation of network connection profiles, ease of use of a networked computer system may be improved from the perspective of both users of individual client computers and a network administrator. Profile information may be provided in a format that is easy to manipulate manually or under computer control. A profile manager may use this profile information to create specific profiles in a native format. A configuration service may use the profiles in native format to establish network connections as in a conventional network computer system.

The profile information may be in a generic format, not specific to an implementation of a configuration service. By developing a computer that can accept profile information in a generic format, users and third parties without knowledge of the native format used by a configuration service can provide profile information, allowing profile information to be readily provided from multiple sources.

One source of profile information may be a group policy agent that can automatically retrieve policy information from a group policy server. In this way, a network administrator of an enterprise network may post profile information that each computer should use. This information may be automatically deployed through group policy agents in client computers throughout the enterprise to provide consistent network connectivity using profiles specified by the network administrator.

Moreover, the easy-to-use format for the profile information may also be extensible. By providing an extensible format, forward and backward compatibility may be provided between configuration services in computers and the profile information. For example, if a computer contains hardware that accepts configuration settings in a profile that were not previously used, the schema used to represent the profile information may be extended to accept parameters describing settings for the added capabilities. Conversely, if the schema for the profile information is extended to include information specifying settings relating to capabilities that some newer computers support, other computers that do not support those capabilities may recognize the extension of the schema and simply ignore it.

Figure 1:
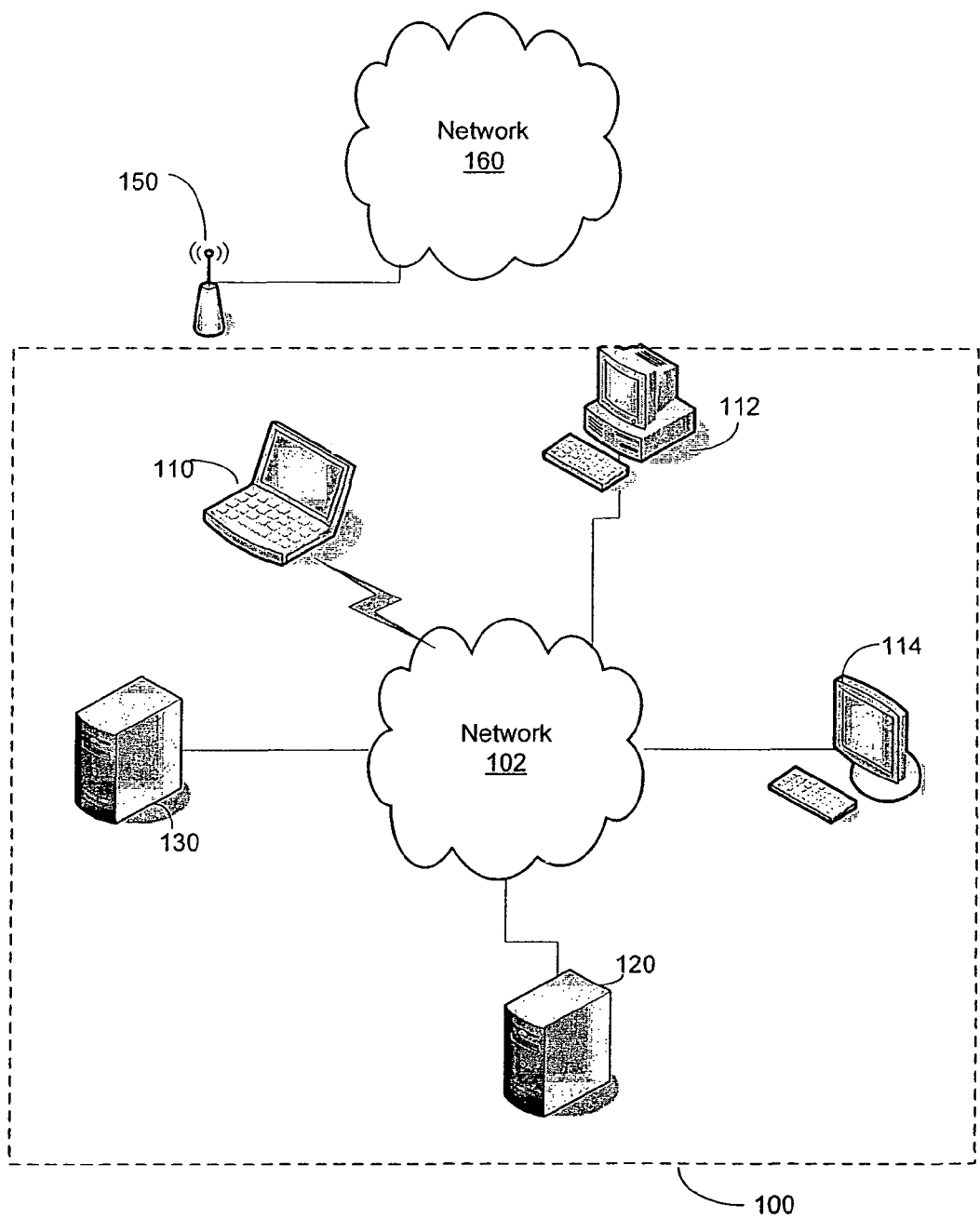
FIG. 1 is a sketch of a network according to an embodiment of the invention.

FIG. 1 provides an example of a computer system in which an embodiment of the invention may be employed. Though the invention is not limited to use in any specific setting, FIG. 1 shows an enterprise network 100, such as may be deployed in a company or other organization. The computer system includes a network 102 that provides interconnectivity between multiple computing devices. In the embodiment illustrated, the networked computer system of FIG. 1 includes backend infrastructure, such as server 120. Server 130 may be a server storing data or providing other functions within the enterprise.

Multiple clients, of which clients 110, 112 and 114 are illustrated may be connected to network 102. Each client computer may be connected to the network in any suitable way. For example, client computers 112 and 114 are illustrated to be connected to network 102 using wired connections. In contrast, client computer 110 is shown connected to network 102 through a wireless connection.

Once clients connect to network 102, they may access backend infrastructure, such as backend infrastructure server 120. Backend infrastructure server 120 may be a server storing data for the enterprise or providing other functions.

FIG. 1 also shows a policy server 130 connected to network 102. Each computer intended to connect through network 102 as a client may be configured with a group policy agent that periodically downloads policy information from policy server 130. Policy information may specify operating characteristics of the client computers. Policy server 130 and policy agents within each of the client computers may be implemented in a conventional fashion, though any suitable implementation may be used.

FIG. 1 is a greatly simplified representation of an enterprise network. An enterprise network may typically include multiple servers and other elements as part of its backend infrastructure. Additionally, a network may include multiple local area networks or have a network topology more expansive than illustrated in FIG. 1.

Though FIG. 1 is a greatly simplified representation of a network, it illustrates a benefit of providing profile information in a generic format. A network administrator may desire to configure each of the client computers 110, 112 and 114 to support certain types of network connections or to disallow certain types of network connections. For example, an undesirable wireless network 160 may operate in the in the vicinity of client computers on enterprise network 100. Undesirable wireless network 160 may represent a network which, if accessed, could compromise the security of the enterprise network 100 or for which access from client computers within the enterprise is otherwise undesirable. For this reason, a network administrator of enterprise network 100 may desire to specify profiles for client computers equipped for wireless connectivity that do not allow those computers to connect to undesirable network 160.

As another example, the network administrator may wish to provide client computers with network profiles so that they can connect to desired networks. Or, a network administrator may wish to provide profiles that take advantage of new security features to all computers within the enterprise that support those security features, even if all computers do not. In these and other scenarios, it may be desirable for each client computer to be provided with network profiles.

Rather than individually program each client computer with the desired profiles, a network administrator may load generic profile information onto policy server 130. Group policy agents within each client computer may download this information. By incorporating a profile manager into the client computer to convert the generic profile information to a native profile for use in that client computer, all of the client computers connected to the network may be readily configured.

Further, because the generic profile information is specified in a format defined by an extensible schema, both old and new computers connected to the network may nonetheless receive and operate on the generic profile information. For example, client computer 114 may be a newer computer than client computer 112. Client computer 114 may be configured with a network interface card that supports advanced encryption options that a network interface card in client computer 112 does not support. A network administrator may provide generic profile information that specifies settings for these advanced encryption options, which client computer 114 may process and apply. Though client computer 112 receives the same generic profile information, which it cannot process, client computer 112 may nonetheless recognize that the advanced encryption options are an extension of the profile information and ignore them without errors in operation.

Figure 2:
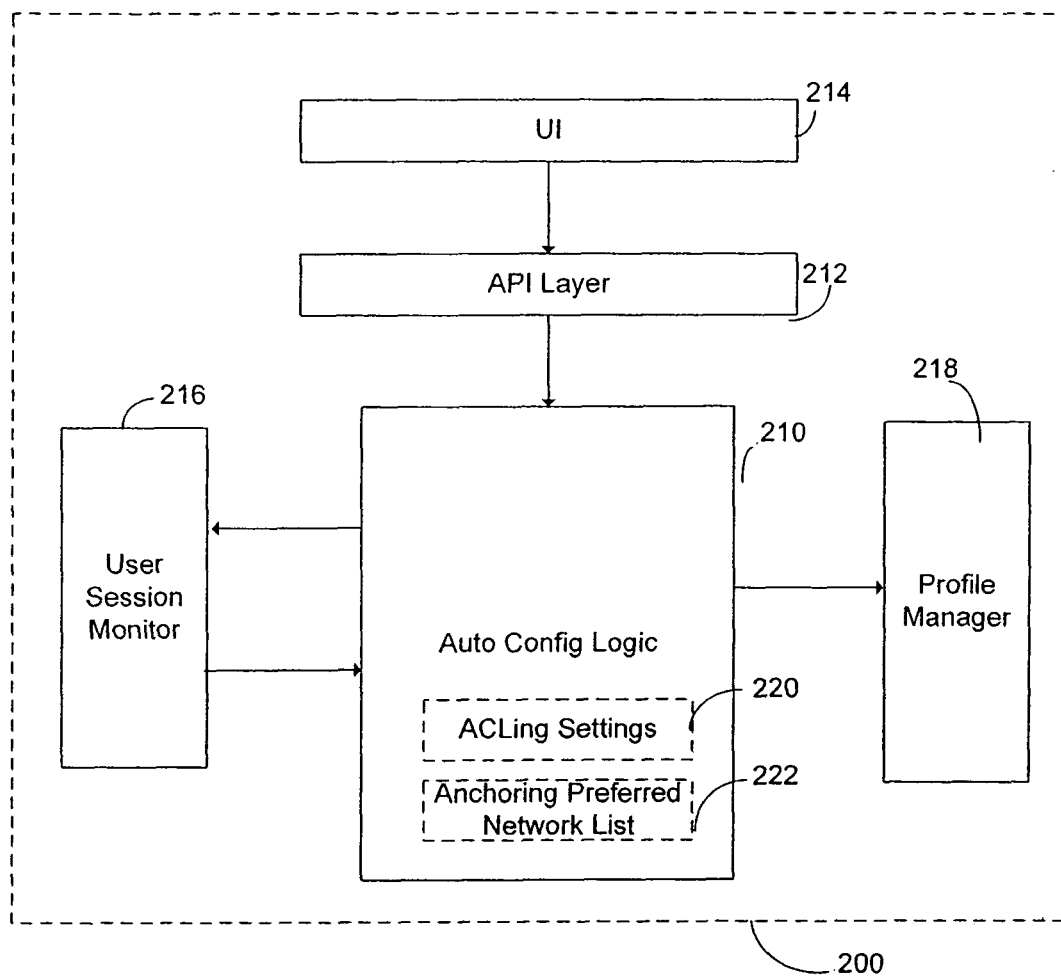
FIG. 2 is a block diagram of a connection service according to an embodiment of the invention.

Turning to FIG. 2, a block diagram of a connection service that may exist inside client computers, such as client computers 110, 112 and 114, is illustrated. Connection service 200 may be implemented in software in a client computer. In the specific example, configuration service 200 may be a component of the operating system of the client computer implemented using known programming techniques.

However, connection service 200 may be implemented in any suitable way. In the illustrated embodiment, connection service 200 is implemented as a plurality of software modules that interact to configure a client computer and establish a connection over a network.

In the embodiment shown, connection service 200 includes an automatic configuration module 210. Automatic configuration module 210 has a programming interface 212 that allows a user interface module 214 to interact with automatic configuration module 210. User interface module 214 may display a user interface through which automatic configuration module 210 may provide information to a computer user. Additionally, user interface module 214 may receive input from that user directing automatic configuration module 210 to establish a connection to a network or to establish or modify a network profile.

Automatic configuration module 210 may interact with profile manager 218, which supplies a profile to automatic configuration logic 210 for use in establishing a network connection. Alternatively, automatic configuration module 210 may provide information to profile manager 218 specifying changes in a profile maintained by profile manager 218.

Automatic configuration module 210 may include components that perform functions useful in forming connections. For example, ACL module 220 may include access control settings associated with network connections and profiles managed by profile manager 218. The access control settings maintained within module 220 may indicate whether a specific user is authorized to perform a requested operation on a profile. Access control settings may be particularly useful in an enterprise setting where multiple users may sequentially or simultaneously access the same physical computer.

User session monitor module 216 provides information to automatic configuration module 210 concerning which user is actively using a computer configured for multiple users. User session monitor module 216 for example, may provide information to automatic configuration module 210 indicating that a user has ended a session, which may trigger automatic configuration module 210 to close all connections that are authorized only for use by that user. Also, session information provided by user session monitor module 216 may be used to determine whether the current user interacting with automatic configuration module 210 through user interface 214 is authorized to perform an action requested by a command provided through user interface 214 or to otherwise enable automatic configuration module 210 to perform functions depending on a user session.

Other modules within automatic configuration module 210 may specify the format of information provided to a user. This information may also be tailored based on the information provided by user session monitor module 216. As one example, anchoring components 222 may specify a preferred order of networks to which a connection is to be established. The preferred order may be used to control connection attempts or may be used to control the order in which information is displayed to a user.

Profile manager 218 stores profiles and provides profile information to automatic configuration module 210. Profile manager 218 may obtain information on profiles used by connection service 200 in any suitable way. In some embodiments, profile manager 218 may receive profile information in a generic format to convert it to native format profiles.

Figure 3:
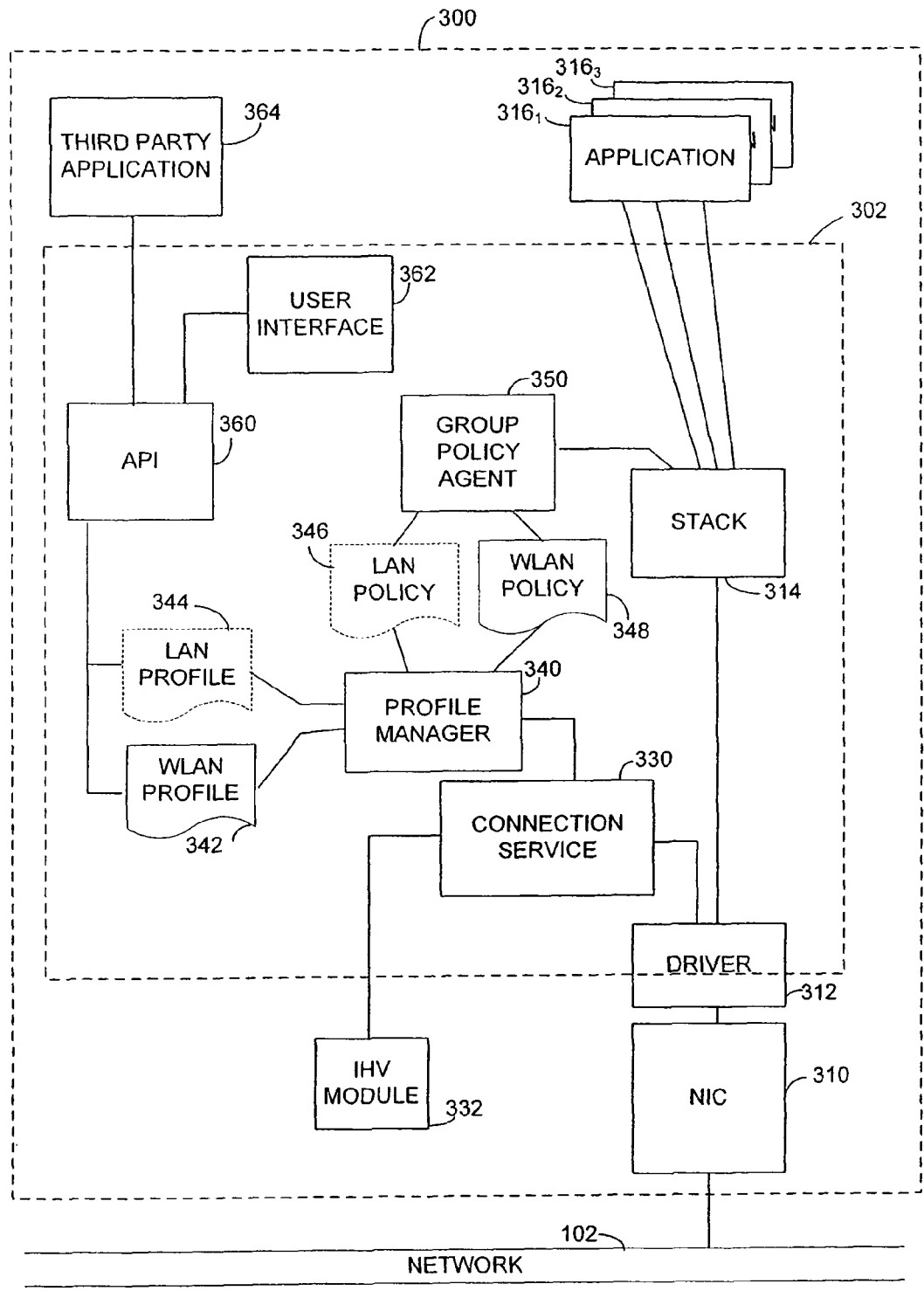
FIG. 3 is a block diagram of a computer according to an embodiment of the invention.

Turning to FIG. 3, a block diagram of a computer 300 operating according to an embodiment of the invention is illustrated. Computer 300 is shown connected to a network 102. Physical connection to the network is made through network interface card 310. Network interface card 310 may be a conventional network interface card providing a physical interface to whatever media is used to connect to network 102. For example, network interface card 310 may be a wired or a wireless network interface card.

In the embodiment illustrated in FIG. 3, computer 300 includes a network interface card 310 that establishes a physical link to network 102. Network interface card 310 may be a conventional network interface card or implemented in any other suitable fashion. In the embodiment of FIG. 1, computer 110 establishes a physical link wirelessly through an access point. In contrast, computers 112 and 114 may establish a physical link through a copper wire, fiber optic cable or any other suitable medium.

Computer 300 contains driver 312 that acts as an interface between network interface card 310 and other software components within computer 110. Driver 312 may be any suitable driver. For example, a suitable driver is described in currently pending U.S. patent application Ser. No. 10/306,169, published as US2004-0103278A1, which is hereby incorporated by reference in its entirety. Such a driver provides an interface to networking components used to facilitate communications for applications such as applications $316_1$, $316_2$ and $316_3$. In the example illustrated, driver 312 provides an interface to stack 314, which in turn provides a mechanism for applications $316_1$, $316_2$ and $316_3$ to communicate over network 102. Stack 314 may be implemented as a conventional stack or may be implemented in any other suitable way.

Driver 312 additionally provides a mechanism for services installed on computer 300 to communicate over network 102 separately from the mechanisms used by applications such as applications $316_1$, $316_2$ and $316_3$. In the specific example, driver 312 is implemented in two portions. One portion is within operating system 302 and a second portion is outside operating system 302. Operating system 302 may be any suitable operating system for computer 300 and may include utilities and services, such as an automated configuration service. In the specific example illustrated, the portion of driver 312 outside of operating system 302 may be provided by a vendor supplying the hardware for network interface card 310. The portion of driver 312 outside of operating system 302 may provide hardware specific control of network interface card 310. The portions of driver 312 within operating system 302 may provide a conventional interface to stack 314, allowing data transmitted over network 102 to be exchanged with applications such as $316_1$, $316_2$ and $316_3$. In addition, the portions of driver 312 within operating system 302 may have access to management and control packets used for communications over network 102. As a result, driver 312 may provide a range of information concerning communications over network 102 to services within operating system 302. This information may be provided in any suitable way.

Driver 312 is also configured to interact with connection service 330, such as through an interface of any suitable construction. Connection service 330 may configure the hardware and software within driver 312 and network interface card 310 to make a connection over a network, such as network 102. To form that connection, connection service 330 may use a profile, specifying settings for the hardware and software within computer 300 to be compatible with network 102. The profile may be provided by profile manager 340.

In the illustrated embodiment, connection service 330 may also receive information from hardware module 332, which may be provided by an independent hardware vendor separately from operating system 302. Information provided by hardware module 332 may be specific to network interface card 310 and may be used by connection service 330 to apply a profile. For example, if network interface card 310 supports communication functions that are not a part of a formal or de facto standard that operating system 302 is coded to support, information about those capabilities may be provided by hardware module 332. Information may be in the form of data identifying those capabilities or may be in the form of control information. For example, hardware module 332 may execute one or more methods used to configure or control network interface card 310.

Connection service 330 may otherwise be implemented as a conventional connection service in a computer. It may receive a profile and apply settings in that profile to create a connection. However, computer 300 differs from a conventional computer in that profile information may be obtained from one or more sources. In the embodiment illustrated, profile manager 340 receives generic profile information and uses it to form native mode profiles that connection service 330 may process when establishing network connections.

In the embodiment of FIG. 3, generic profile information includes LAN profile information 344, WLAN profile information 342, LAN policy information 346 and WLAN policy information 348. As shown, LAN profile information 344 and WLAN profile information 342 is obtained through a programming interface 360. Programming interface 360 may in turn be connected to a user interface 362 or a third party application is 364. Accordingly, LAN profile information 344 or WLAN profile information 342 may be provided by a user, interacting with computer 300 through a user interface device controlled by user interface 362. Or, LAN profile information 344 and WLAN profile information 342 may be obtained from a third party application provided separately from operating system 302 that specifies connection profile information—even if that application is developed without knowledge of the native mode format used by connection service 330 to represent a profile.

In the embodiment illustrated, LAN policy information 346 and WLAN policy information 348 is derived from group policy agent 350. Group policy agent 350 connects to a network through stack 314 and may download policy information from a policy server, such as policy server 130 (FIG. 1). As with LAN profile information 344 and WLAN profile information 342, LAN policy information 346 and WLAN policy information 348 may be developed without knowledge of the native mode format used by connection service 330 to represent a profile and may even be provided to multiple computers that use different native mode representations of profiles.

In the embodiment illustrated, LAN profile information 344 defines one or more profiles computer 300 may use to connect to a wired local area network (LAN). Likewise, WLAN profile information 342 contains information on one or more profiles that computer 300 may use to make a connection to a wireless network. LAN policy information 346 contains information on one or more policies on connections that should or should not be formed over a wired LAN to which computer 300 may be connected. Similarly, WLAN policy information 348 specifies information about connection that should or should not be formed to a wireless network.

Profile manager 340 may use WLAN profile information 342, LAN profile information 344, LAN policy information 346 and WLAN policy information 348 to form one or more profiles that connection service 330 may use to establish connections. This policy information may have an order of precedence and may be combined in accordance to its order of precedence. For example, policy information may be given a higher precedence than profile information.

It is not necessary that all types of information be present. For example, if connection service 330 is a wireless connection service, profile information concerning a wired LAN may be omitted. Accordingly, LAN profile information 344 and LAN policy information 346 may optionally be omitted. However, LAN profile information 344 and LAN policy information 346 is illustrated in FIG. 3 to demonstrate that the sources and types of policy information represented in a generic form is not a limitation on the invention.

In the embodiment illustrated, each type of profile information may be represented in a different format. In the pictured embodiment, each type of information is represented with a schema that defines allowable information elements. The information elements are tagged, allowing easy manipulation of the information in the generic format. As a specific example, generic profile information may be stored in one or more XML files. In the embodiment illustrated, each type of profile information is stored in a separate XML file in accordance with a schema for that type. Further, a separate file may be used for each instance of a type of profile information. For example, if information is provided for multiple networks, a separate file may be used for information associated with each network.

By storing the information in XML files, for example, user interface 362 may readily create displays of the profile information, allowing a user to edit the profile information. In the embodiment illustrated, LAN profile information 344 and WLAN profile information 342 are accessible through API 360, allowing a user or third party application 364 to manipulate that data. Conversely, in the embodiment shown, LAN policy information 346 and WLAN policy information 348 is not accessible to programming interface 360 so that it is not editable by a user. However, in alternative embodiments, all profile information may be editable.

Figure 4:
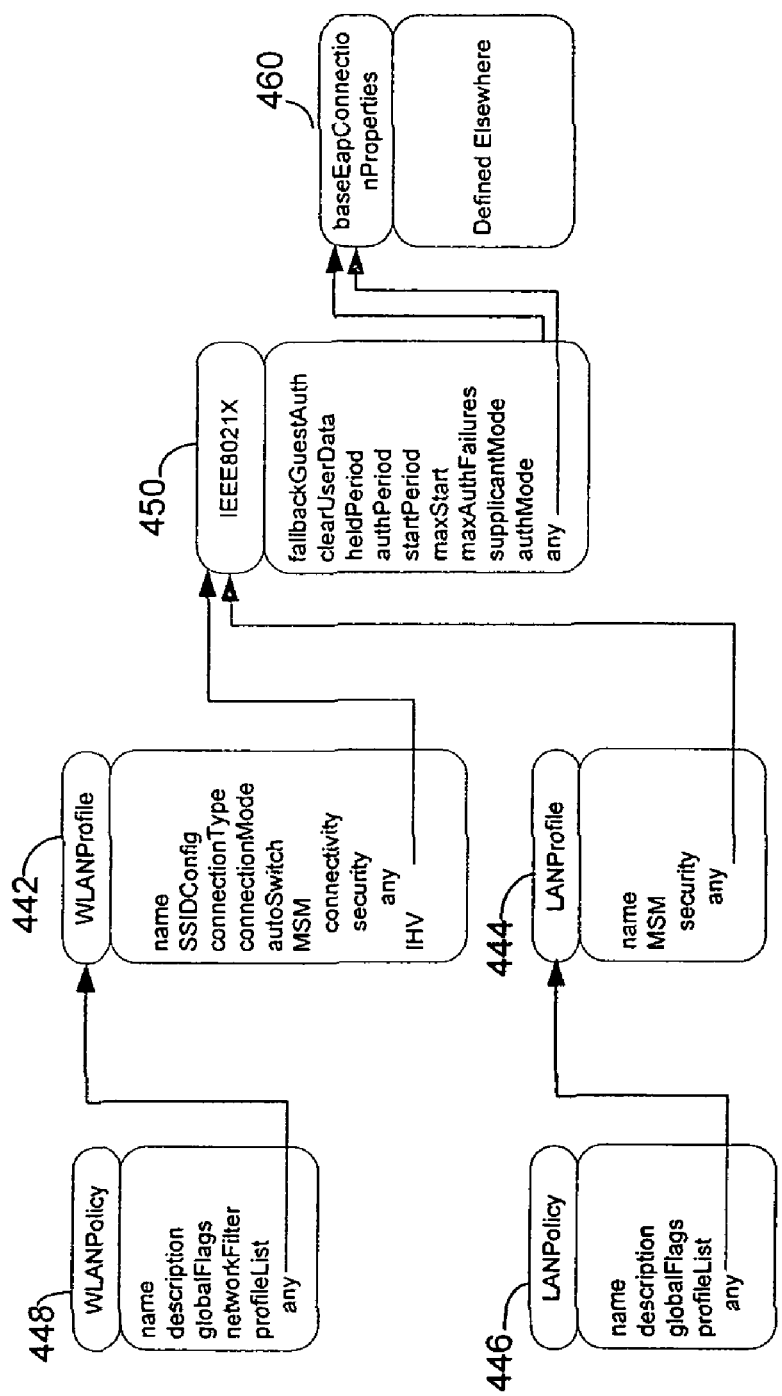
FIG. 4 is a sketch illustrating a schema for profile information according to an embodiment of the invention.

Generic profile information may be stored in any suitable form. In some embodiments, generic profile information is stored as XML files according to one or more XML schema. FIG. 4 illustrates schema that may be used to store generic profile information of the types illustrated in FIG. 3. A separate schema is provided for each type of generic profile information. FIG. 4 illustrates a separate WLAN policy schema 448, a LAN policy schema 446, a WLAN profile schema 442 and a LAN profile schema 444.

Providing separate schema for each type of information may simplify the process of defining schema containing multiple different types of information. For example, configuring a network interface card for connection to a wireless networks requires specification of different settings than to configure a network interface card to a wired network. Also, connection to a wireless network may entail greater security risks, resulting in different policy information being specified for such networks.

Additionally, providing separate schema allows an order of precedence to be specified for the different types of information. For example, WLAN policy schema 448 and LAN policy schema 446 may take precedence over WLAN profile schema 442 and a LAN profile schema 444.

In the embodiment illustrated, WLAN policy schema 448 and LAN policy schema 446 specify elements that may appear in an XML file specifying policy aspects of the profiles that may be created on the client computer. This policy information may specify connections that may be formed or connections that may not be formed or conditions under which connections may be formed. In the illustrated embodiment, information relating to policies defining connections that may or may not be formed is separated from the information defining settings used to form those connections. This type of segmentation allows policy information to be provided from a different source than the connection information. It also allows the policy information to be treated differently. For example, FIG. 3 illustrates that policy information is not editable by a user of a computer receiving that policy information. However, the specific segmentation of the profile information is not a limitation on the invention. Policy and connection information may be combined or separated or provided in any other suitable fashion.

In the embodiment illustrated, WLAN policy schema 448 specifies data elements including a policy name, a description, one or more global flags and connections for which that policy may be used. In the example of FIG. 4, profile information is specified hierarchically. Therefore, identification of a connection may be made by reference to WLAN profile schema 442, indicating that a connection may be identified in a file according to WLAN policy schema 448 by reference to an XML file holding data for a connection in accordance with WLAN profile schema 442. However, the specific mechanism by which a connection is identified is not a limitation on the invention.

In the example of FIG. 4, WLAN policy schema 448 incorporates a "network filter" element. In an XML file constructed according to WLAN policy schema 448, the network filter element may include a list of specific networks to which connections are allowed and/or a list of networks to which connections are not allowed. A profile manager processing such an XML file may selectively form profiles for use in establishing connections that are consistent with the values specified for the network filter element.

LAN policy schema 446 similarly defines elements of a policy that may be used for establishing connections to a wired LAN. LAN policy schema specifies elements similar to those specified in WLAN policy schema 448. However, in the illustrated embodiment, LAN policy schema 446 does not include a network filter element. Such an element may be omitted in connection with a wired LAN because physical control over an office or other facility in which an enterprise network is deployed may preclude undesired connections to a wired LAN and network filtering may be less valuable in that context. However, in other embodiments, LAN policy schema 446 may have the same form as WLAN policy schema 448. More generally, all of the schema illustrated in FIG. 4 are for purposes of illustration. Any schema may have additional, different or fewer elements than depicted.

In the embodiment illustrated, WLAN profile schema 442 specifies entries that collectively define a configuration to establish a wireless connection. Likewise, LAN profile schema 444 contains entries that collectively define a configuration for making a wired connection. The specific values of the elements specified in an XML file according to the schema specify parameters for those settings. In the embodiment illustrated, WLAN profile schema 442 and LAN profile schema 444 have different structures, reflecting the different types of information that are used to establish a wireless versus a wired connection. However, the invention is not so limited and the same schema may be used for different network types.

In use, WLAN profile schema 442 and LAN profile schema 444 may be used to create XML files containing values of the elements in the schema that may be applied within a computer to configure that computer for a specific network connection. In the example of FIG. 4, WLAN profile schema 442 specifies elements such as a connection name, an SSID configuration, a connection type, a connection mode, information about connectivity and information about specific hardware modules, denoted as IHV.

WLAN schema 442 may also specify security information. In the embodiment illustrated, the schema are defined according to a hierarchy, with some types of information being defined in schema that are referenced by other schema. In the example of FIG. 4, security information is defined by a separate schema. Accordingly, WLAN profile schema 442 references security schema 450. In this example, security schema 450 defines a schema for storing configuration information used by a device wanting to authenticate according to the IEEE 802.1X protocol. However, one or more security schema may be provided and referenced in WLAN profile schema 442, or any other profile schema that may be defined.

In a similar fashion, though not shown, information about non-standardized hardware configurations could be provided within WLAN profile schema 442 or may be incorporated hierarchically by reference to another schema. Any other type of information may likewise be incorporated in WLAN profile schema 442 directly or by reference to another schema.

As a further example of elements that may be defined in a schema, WLAN profile schema 442 is also shown to include an "auto switch" element. The auto switch element is an example of an element that provides control information for software that establishes a connection using a profile created based on WLAN profile schema 442. In this example, when the auto switch element is present in an XML file, a computer that recognizes that element will automatically reconfigure to connect to a different network when a better network becomes available.

LAN profile schema 444 similarly defines elements that may be included in an XML file providing profile information for a wired network connection. In this example, LAN profile schema 444 includes elements to specify a name and security. As with WLAN profile 442, LAN profile 444 specifies security information hierarchically, by reference to another schema. In this example, IEEE 802.1X security schema 450 is the only security schema illustrated, but in other embodiments, different additional security schema may be specified.

FIG. 4 further illustrates the hierarchical nature of the schema definition. As shown, each policy schema 446 and 448 references one or more profile schemas, such as 442 and 444. Each profile schema, in turn, may reference one or more security schemas, such as security schema 450. Security schemas may, in turn, reference additional schemas. In this example, the IEEE 802.1X protocol is extensible. In the embodiment illustrated, an extension schema 460 is illustrated. One or more extension schemas may be provided, each representing one or more possible security protocol extensions.

Figure 5:
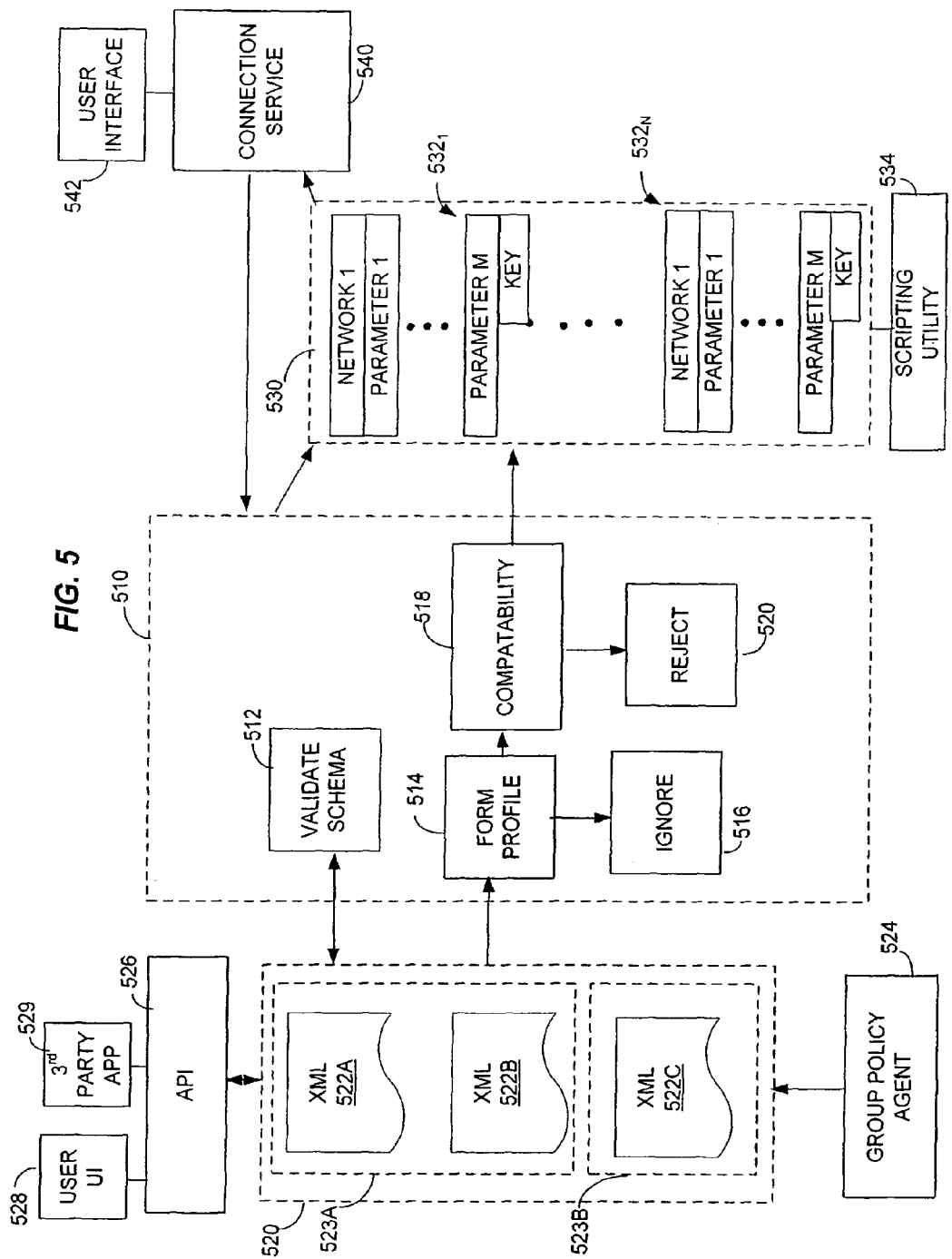
FIG. 5 is a functional block diagram illustrating a method of operation of a computer according to an embodiment of the invention.

Regardless of the specific form of the schema, the schema may be used to establish profiles which may, in turn, be used to establish network connections. FIG. 5 illustrates a functional block diagram of the interactions that may occur in creating profiles for network connections. FIG. 5 shows a generic profile store 520. In the illustrated embodiment, generic profile store 520 includes two portions. XML files 522A and 522B are stored in persistent portion 523A. XML file 522C is stored in cache 523B.

In the illustrated embodiment, profile information obtained from group policy agent 524 is stored in cache 523B. Profile information stored in cache 523B is updated periodically. The update frequency may be driven by the operation of group policy agent 524. The specific update frequency is not a limitation on the invention but, for example, may be approximately 90 minutes. Accordingly, information in cache 523B may be changed periodically when group policy agent 524 may download information from a policy server. However, during intervals when group policy agent 524 is unable to download information, information in cache 523B may be retained so that policy information is nonetheless available for use in forming profiles.

In contrast, information stored in persistent storage 523A is intended to remain until altered or deleted. In the embodiment illustrated, profile information is stored in persistent portion 523A through a programming interface 526. Interactions by a user may be communicated from a user interface 528 through programming interface 526. The interactions may create, delete or alter any of the XML files in persistent portion 523A. In the illustrated embodiment in which generic profile information is stored as XML files, conventionally available tools for creating, editing or deleting XML files may be provided through programming interface 526.

Also as shown in FIG. 5, third party applications 530 may create, edit or delete XML files 522A and 522B in persistent storage portion 523A. However, in the embodiment illustrated, neither a user nor a third party application has access to XML file 522C stored in cache 523B.

Regardless of how each XML file is created, profile manager 510 may perform a validation function on the files. A validate schema function 512 may be performed each time an XML file is created or edited. Validate schema function 512 determines whether the XML file, as created or edited, is consistent with the defined schema. For example, if XML file 522A is a WLAN profile schema, validate schema function 512 may determine that it contains elements and/or values consistent with WLAN profile schema 442 (FIG. 4).

To provide extensibility, validate schema function 512 determines only whether the XML file is inconsistent with the schema for that type of file. It does not identify as an error files that have additional elements not specified in the schema that validate schema function 512 applies. In this way, extensions to a schema made after the programming to implement validate schema function 512 was developed are not rejected as erroneous. However, if validate schema function 512 detects an XML file that is inconsistent with the schema for that file type, that XML file may be removed from generic profile store 520 or other suitable error handling processing may be performed.

The XML files in generic profile store 520 are used to create native mode profiles that are ultimately stored in native mode profile store 530. Processing within profile manager 510 converts the XML files in generic profile store 520 into native mode profiles. Form profile function 514 may read an XML file from generic profile store 520 and construct a native mode profile from the information in that file. If form profile function 514 encounters elements in the XML file that it is not programmed to process, an ignore function 516 may be performed on those elements. In the embodiment illustrated, an ignore function 516 does not represent an error condition. Rather, ignore function 516 signifies that form profile function 514 may continue forming a native mode profile without using the elements it is not programmed to recognize. In this way, XML files based on a schema that has been extended can be used by computers not programmed to recognize the extensions.

Compatibility function 518 is also performed as part of forming a native mode profile that may be applied to establish a connection. Compatibility function 518 involves comparing the profile information for the profile being converted to native mode to any policy information that may be included in generic profile store 520. If the connection is to a network prohibited by policy information or otherwise incompatible with operation on the computer on which profile manager 510 resides, that native mode profile may be rejected by reject function 520. Unlike ignore function 516 in which processing continues to create a native mode profile, when reject function 520 is performed, no native mode profile is formed. In this way, a computer is precluded from connecting to prohibited networks or prohibited from attempting to connect using a profile that is incompatible with policy information.

The timing of the functions illustrated is not critical to the invention. For example, compatibility function 518 maybe performed before or after form profile function 514.

If formation of a native mode profile is not rejected, a native mode profile may be stored in native mode profile store 530. Native mode profile store 530 may be stored in any suitable computer readable media. In this example, each profile is stored as a data structure in a native mode used by connection service 540. The specific form on that data structure is not critical to the invention and any suitable form may be used. For purposes of illustration, native mode profiles $532_1 \ldots 532_N$ are illustrated in native mode profile store 530. Each of the native mode profiles $532_1 \ldots 532_N$ may have the same format. In the illustrated embodiment, each profile has a plurality of fields. For example, one field may identify a network to which the profile applies. Other parameters may specify hardware or software settings within the computer on which the process of FIG. 5 is performed. Additionally, credential or other security information that may be used to log on to a network optionally may be stored in profile. In some embodiments, all or portions of each profile is encrypted as stored in memory. For example, only credential and security information of a profile may be encrypted. Though, the invention is not limited in this regard and any portion or portions of the profiles may be encrypted to provide a suitable level of security. The profiles may be encrypted in a format that connection service 540 may un-encrypt. In this way, unauthorized changes or access to profiles may be avoided. However, the specific format used to store native mode profiles is not a limitation on the invention and any suitable format may be used.

FIG. 5 shows that a scripting utility 534 may perform functions on profiles. In embodiments in which profiles are encrypted, scripting utility 534 may also un-encrypt the profiles to have access to them. Scripting utility 534 may provide a user interface (not shown), such as a command line interface, that allows a user to specify functions to be performed on specific profiles stored in native mode profile store 530. In this regard, scripting utility 534 performs functions that may be similar to those that may be performed on generic profiles stored in generic profile store 530 through user interface 528 or may be performed by third party applications 530.

In other embodiments, scripting utility 534 may operate on profiles in native mode profile store 530. In such an embodiment, scripting utility 534 may be implemented based on knowledge of a specific native mode format used to store profiles in native mode profile store 530. In contrast, user interface 528 and third party application 529 may be created using generic knowledge of a schema for profile information without specific knowledge of the native mode format used to store profiles.

Connection service 540 accesses native mode profile store 530 to obtain a profile for a network to which it is attempting to establish a connection. In the embodiment illustrated, a user provides input through user interface 528 to connection service 540. This input may specify a network to which a connection is desired. In response to user input specifying a network connection, connection service 540 may access native mode profile store 530. If a profile exists for the specified network, connection service 540 may retrieve it from native mode profile store 530. However, if no profile exists, connection service 540 may access profile manager 510, indicating that a native mode profile should be create for the specified network. The form profile function 514 in profile manager 510 may be performed in response to such an interaction from connection service 540.

Figure 6:
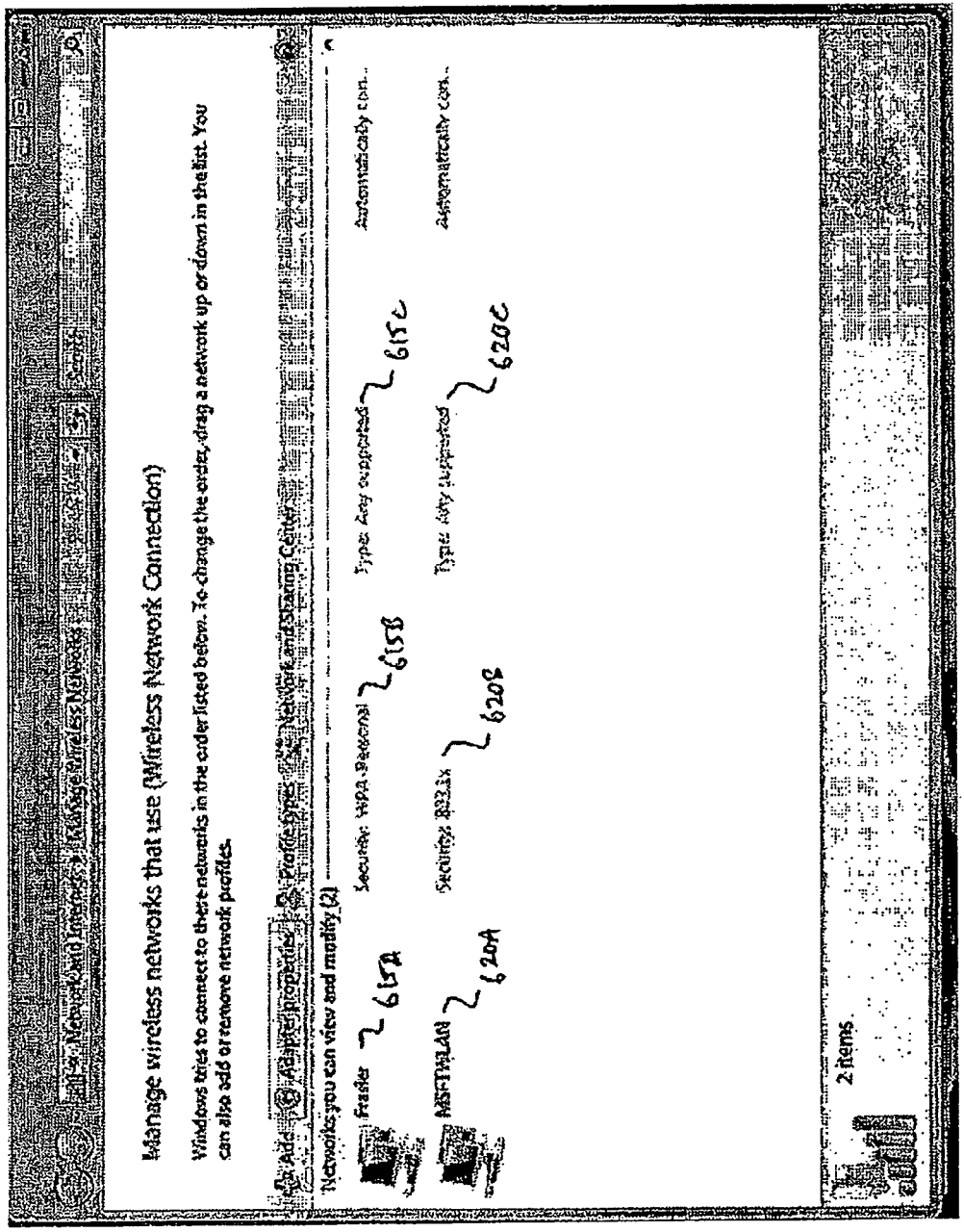
FIG. 6 is a sketch of a graphical user interface according to an embodiment of the invention.

Turning to FIG. 6, an exemplary window presented via user interface 542 is shown. Specifically, window 610 displays icons 615A and 620A, representing profiles for two wireless networks named "Frasier" and "MSFTWLAN," respectively. Properties are also shown for each profile, including security type (615B, 620B) and radio type (615C, 620C). The window illustrates the types of information about a connection a user may wish to edit.

Information for the display of FIG. 6 may be obtained from either generic mode profile store 520 and may be obtained through an interface such as user interface 528, which allows generic mode profiles to be edited. In other embodiments, the information may be derived from native mode profile store 530 using any suitable interface.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rackmounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-storage device having computer-executable components adapted for use in a computer that is connectable to a network, the computer-executable components comprising:
   a) a communication service that, when executed by a processor, applies a configuration to the computer to form a connection over the network, the configuration based at least in part on a profile in a native mode;
   b) at least one interface that, when executed by a processor:
      receives information from a source outside the computer, the received information defining generic profile information in an extensible format, and
      alters stored generic profile information based on the received information; and
   c) a component that, when executed by a processor, forms the profile in the native mode from the stored generic profile information by processing at least one element in the stored generic profile information, the processing comprising, for each element of the at least one element:
   when the element is consistent with a schema applied by the component, adding information to the profile in the native mode based on the element;
   when the element is inconsistent with the schema, signaling an error condition; and
   when the element is not defined within the schema but is not inconsistent with the schema, ignoring the element in forming the profile in the native mode,
   whereby the profile in the native mode is generated for use by the configuration service in configuring the computer based on the generic profile information received through the interface when the computer-executable components are executed.

2. The computer-storage device of claim 1, wherein the generic profile information comprises a plurality of XML documents.

3. The computer-storage device of claim 1, wherein the generic profile information in an extensible format comprises a plurality of information elements, each information element having a tag identifying the type of information in the information element.

4. The computer-storage device of claim 1, wherein the at least one interface comprises a user interface.

5. The computer-storage device of claim 1, wherein the at least one interface comprises a client agent configured to download information from a central source.

6. The computer-storage device of claim 1, wherein the at least one interface comprises an Application Programming Interface that interfaces with a program module provided by a hardware vendor.

7. A computer that is connectable to a network, the computer comprising:
a computer-storage device comprising:
a) profile information comprising:
  i) a first data structure comprising a plurality of fields collectively defining group policy information in a generic format; and
  ii) a second data structure comprising a plurality of fields collectively defining at least one type of profile information separate from the group policy information, the at least one type of profile information being in the generic format; and
b) computer-executable components comprising:
  i) a group policy agent that, when executed by a processor, obtains the group policy information from a group policy server and stores it in the first data structure;
  ii) a component that, when executed by a processor, merges the profile information in the generic form in the first data structure and the second data structure and converts the merged profile information into a profile in a native format, the native format being different than the generic format, the group policy information being given a higher precedence than the at least one type of profile information separate from the group policy information in forming the profile; and
  iii) a communication service that, when executed by a processor, configures the computer based on a profile in the native format to form a connection over the network, wherein:
  the communication service comprises a profile management component that forms the profile from the profile information;
  the profile management component ignores elements of the profile information it is not programmed to recognize and forms a profile based on portions of the profile information it is programmed to recognize; and
  the profile management component rejects formation of a profile for a connection that is inconsistent with the group policy information.

8. The computer of claim 7, wherein the computer-executable components further comprise at least one interface that, when executed by a processor, in response to user input modifies the profile information in the second data structure and precludes modification of the profile information in the first data structure.

9. The computer of claim 8, wherein the at least one interface processes information in an extensible format.

10. The computer of claim 9, wherein the extensible format is XML.

11. A method of operating a computer that is connectable to a network, the computer comprising a connection service that applies to the computer profiles in a native format, and the method comprising:
a) receiving a plurality of types of profile information, the types of profile information having an order of precedence, and the profile information being in a generic format, the generic format being different than the native format, and the plurality of types of profile information comprises at least one group policy profile and information received through a programming interface;
b) forming at least one profile from the profile information by merging the profile information of the plurality of types in accordance with the order of precedence, each of the at least one profiles being in the native format;
c) storing the at least one profile in memory of the computer, and
d) validating that the profile information is not inconsistent with a profile information specification prior to forming the at least one profile, the validating comprising:
when the profile information is consistent with the profile information specification, adding information to the profile based on the element;
when the profile information is inconsistent with the profile information specification, signaling an error condition; and
when the profile information is not defined within the profile information specification but is not inconsistent with the profile information specification, ignoring the element in forming the profile.

12. The method of claim 11, wherein the group policy profile has the highest precedence in the order of precedence.

13. The method of claim 11, wherein receiving at least one group policy profile comprises caching the group policy profile and refreshing the cached group policy profile from a group policy server.

14. The method of claim 11, further comprising modifying at least one of the plurality of types of profile information through a programming interface.

15. The method of claim 14, wherein receiving a plurality of types of profile information comprises receiving at least one XML file.

* * * * *